(12) United States Patent
Koellnberger

(10) Patent No.: US 10,870,736 B2
(45) Date of Patent: Dec. 22, 2020

(54) QUARTZ-CONTAINING SILICONE COMPOSITIONS WHICH ARE LOW IN CYCLIC COMPOUNDS

(71) Applicant: Wacker Chemie AG, Munich (DE)

(72) Inventor: Andreas Koellnberger, Kirchdorf (DE)

(73) Assignee: WACKER CHEMIE AG, Munich (DE)

( * ) Notice: Subject to any disclaimer, the term of this patent is extended or adjusted under 35 U.S.C. 154(b) by 87 days.

(21) Appl. No.: 15/737,373

(22) PCT Filed: Jun. 15, 2016

(86) PCT No.: PCT/EP2016/063703
§ 371 (c)(1),
(2) Date: Dec. 18, 2017

(87) PCT Pub. No.: WO2016/202833
PCT Pub. Date: Dec. 22, 2016

(65) Prior Publication Data
US 2018/0171081 A1    Jun. 21, 2018

(30) Foreign Application Priority Data

Jun. 17, 2015   (DE) ................. 10 2015 211 172

(51) Int. Cl.
| | | |
|---|---|---|
| *C08J 3/20* | (2006.01) | |
| *C08L 83/04* | (2006.01) | |
| *C08K 3/36* | (2006.01) | |
| *C08K 3/34* | (2006.01) | |
| *C08K 3/22* | (2006.01) | |

(52) U.S. Cl.
CPC ............ *C08J 3/203* (2013.01); *C08K 3/34* (2013.01); *C08K 3/36* (2013.01); *C08L 83/04* (2013.01); *C08J 2383/04* (2013.01); *C08K 2003/2206* (2013.01); *C08K 2003/2224* (2013.01)

(58) Field of Classification Search
USPC ........................................ 525/474, 477–479
See application file for complete search history.

(56) References Cited

U.S. PATENT DOCUMENTS

| 5,071,885 A | * | 12/1991 | Johnson | ..................... C08J 9/02 521/117 |
| 5,882,467 A | * | 3/1999 | Sierawski | ................ C08K 3/22 106/18.26 |
| 5,908,888 A | | 6/1999 | Nakamura et al. | |
| 6,288,143 B1 | | 9/2001 | Caradori et al. | |
| 2010/0152327 A1 | | 6/2010 | Schuster et al. | |

FOREIGN PATENT DOCUMENTS

| CN | 103937256 A | 7/2014 |
| CN | 104086996 A | 10/2014 |
| EP | 1313598 B1 | 6/2006 |
| EP | 2206737 A1 | 7/2010 |
| EP | 1110691 B1 | 8/2011 |
| EP | 2032655 B1 | 4/2012 |
| JP | 8311343 A2 | 11/1996 |

\* cited by examiner

*Primary Examiner* — Marc S Zimmer
(74) *Attorney, Agent, or Firm* — Brooks Kushman P.C.

(57) ABSTRACT

Generation of cyclic siloxanes in silicone compositions containing quartz flour as a filer is reduced by incorporating a basic substance into the composition prior to adding filler.

7 Claims, No Drawings

QUARTZ-CONTAINING SILICONE COMPOSITIONS WHICH ARE LOW IN CYCLIC COMPOUNDS

CROSS REFERENCE TO RELATED APPLICATIONS

This application is the U.S. National Phase of PCT Appln. No. PCT/EP2016/063703 filed Jun. 15, 2016, which claims priority to German Application No. 10 2015 211 172.5 filed Jun. 17, 2015, the disclosures of which are incorporated in their entirety by reference herein.

BACKGROUND OF THE INVENTION

1. Field of the Invention

The present invention relates to quartz-containing silicone compositions which are low in cyclic compounds and a method for producing them.

2. Description of the Related Art

Silicone compositions which contain quartz flour as a filler and methods for producing them have long been known in the prior art.

EP2206737 describes a method for the continuous production of high viscosity silicone mixtures by means of a kneader cascade. As suitable fillers, quartz flours are also mentioned, without taking account of the problem of cyclic compound formation.

In EP1313598 and EP2032655, compounding methods which mention ground quartz as a possible filler are also described.

In the continuous production of silicone compounds, which is described in EP1110691, quartz can also be used as a filler, with the emphasis being placed on the devolatilization of the compounds. In this devolatilization, temperatures between 150° C. and 200° C. are needed.

U.S. Pat. No. 6,288,143 also utilizes quartz as a filler at elevated temperatures, without going into the problem of cyclic compound formation.

In studies on the storage stability of quartz-containing silicone compositions, it was established that during storage, cyclic compounds form relatively rapidly in the compounds on a not insignificant scale. The cyclic compounds are the trimeric hexamethylcyclotrisiloxane (D3), the tetrameric octamethyl-cyclotetrasiloxane (D4), the pentameric decamethyl-cyclopentasiloxane (D5) and the hexameric tetradecamethyl-cyclohexasiloxane (D6), with the incidence/scale of their formation being as follows D4>D5>D6>D3. Probably, the acidic-acting Si—OH groups of the quartz flour exhibit catalytic activity, as a result of which in the case of polysiloxanes, which are also contained in these compositions, truncations form and these cleave off as cyclic compounds. Initial studies indicate that at least a part of these cyclic compounds may be harmful to health and the environment. Thus D4 is suspected of being able to cause liver damage, and D5 lung damage. Since silicone compositions and curing products thereof often go into many applications which come into contact with food or the human body, for example in cosmetics and silicone rubber moldings such as baking molds, pacifiers, breathing masks, hoses and the like, the formation of D3-D6 cyclics on storage of ready-to-use quartz flour-containing silicone compositions is undesirable from the toxicological point of view.

SUMMARY OF THE INVENTION

An objective of the invention was therefore to provide quartz-containing silicone compositions with greatly reduced cyclic compound formation during their storage, and a method for producing them. Surprisingly, this problem is solved by the quartz-containing silicone composition according to the invention, which is characterized in that during compounding 0.1-5 wt. % of at least one basic-reacting compound (Z) is completely mixed homogeneously into at least a part of the other components and only then, the incorporation of the special quartz flour filler (Y takes place.

DETAILED DESCRIPTION OF THE PREFERRED EMBODIMENTS

A considerable advantage of the invention is that during storage of the quartz-containing silicone compositions, considerably less formation of the cyclic compounds D3 to D6 takes place. Here it is immaterial whether the production takes place continuously or discontinuously (batchwise). It has moreover been found that the nature of the crosslinker type and hence the crosslinking mechanism also has no influence, since both condensation-crosslinking, addition-crosslinking, peroxide-induced crosslinking and photo-induced crosslinking silicone compositions exhibit decreased cyclic compound formation when (Z) was completely incorporated before (Y) in the compounding. Compositions containing silicones and quartz filler have long been known in the prior art, hence this result was very surprising. In contrast to this, with reversed or simultaneous incorporation no such effect appeared. Hence as a point essential to the invention, it is important, for all crosslinker types, that the basic-reacting compound (Z) is always completely incorporated into at least a part of the other components of the composition before compounding with the special quartz flour filler (Y).

A further subject of the invention is the method for the production of quartz-containing silicone compositions, characterized in that during the compounding 0.1-5 wt. % of the basic-reacting compound (Z) is always completely mixed homogeneously into at least a part of the other components and the incorporation of the special quartz flour filler (Y) only then takes place.

Although already long known in the prior art, a short description of suitable silicone compositions is given here.
Addition-Crosslinking Silicone Compositions Addition-crosslinking silicone compositions have long been known to those skilled in the art. In the simplest case, addition-crosslinking silicone compositions contain at least one organopolysiloxane with at least two aliphatically unsaturated groups in the molecule (e.g. Si-bound vinyl groups), and at least one organohydrogen polysiloxane with two or more SiH groups in the molecule and at least one catalyst promoting the addition of Si-bound hydrogen to aliphatic multiple bonds, which is also described as a hydrosilylation catalyst. The consistency of addition-crosslinking silicone compositions can be adjusted such that HTV (high temperature vulcanizing), LSR (liquid silicone rubber) and also RTV (room temperature vulcanizing) silicon elastomers can be produced. These can be one-, two- or multi-component compositions.
Condensation-Crosslinking Silicone Composition Condensation-crosslinking silicone compositions have long been known to those skilled in the art. Common examples of condensation-crosslinking silicone compositions bear the designations RTV-1 (1-component) and RTV-2 (2-component). RTV-2 compounds typically contain in one of the components at least one organopolysiloxane with terminal silanol groups and further constituents such as fillers and plasticizers. The second component (the curing agent) contains a crosslinker silane or siloxane in combination with a catalyst accelerating the condensation reaction and optionally further constituents such as plasticizers. As the crosslinker silane or siloxane, the silanes and siloxanes having at least three hydrolyzable residues are mainly used. The condensation-crosslinking RTV-1 compounds which on entry of atmospheric moisture cure to give a silicone elastomer with elimination of a hydrolysis product, are based on the possibility of being able to end-block terminal silanol organopolysiloxanes with a crosslinker containing several hydrolyzable, without at the same time causing crosslinking. As crosslinkers, all silanes having at least three hydrolyzable groups or partial hydrolyzates thereof can be used. In order to achieve a sufficiently high crosslinking rate, most RTV-1 compounds contain a condensation catalyst, for example organotin and organotitanium compounds or metal compounds of main groups I and II.

Peroxide-Induced Crosslinking Silicone Compositions

These compositions have also long been known to those skilled in the art. In the simplest case, peroxide-induced crosslinking silicone compositions contain at least one organopolysiloxane with at least 2 crosslinkable groups per molecule such as for example methyl or vinyl groups and at least one suitable organic peroxide catalyst. They are usually produced as HTV compounds.

Photo-Induced Crosslinking Silicone Compositions

These compositions have also long been known to those skilled in the art. Photo-induced crosslinking silicone compositions contain, depending on the reaction mechanism, at least one photoactivatable initiator or catalyst.

In addition, all the aforesaid silicone compositions according to the invention can contain further additives (W), which were also previously used in their production, such as for example reinforcing fillers which are different from quartz flour (Y), non-reinforcing fillers, fungicides, fragrances, rheological additives, corrosion inhibitors, oxidation inhibitors, light stabilizers, flame retardants and agents for influencing the electrical properties, dispersant additives, solvents, adhesion promoters, pigments, dyes, plasticizers, organic polymers, heat stabilizers, solvents, inhibitors, stabilizers, fungicides, fragrances, and the like.

The basic-reacting component (Z) can be an organic or inorganic compound. Inorganic compounds are preferred. Their pH is 8 to 14 measured in deionized water, as a saturated solution, preferably 9 to 13. Examples of component (Z) are metal hydroxides, carbonates or hydrogen carbonates, phosphates, hydrogen phosphates or mixtures thereof reacting alkaline with water. Hydroxides and carbonates of the alkali and alkaline earth metals or mixtures thereof are preferred and $Ca(OH)_2$ and $Mg(OH)_2$ or mixtures thereof are particularly preferred as (Z). 0.1-5 wt. %, preferably 0.2-3 wt. %, of (Z) are completely compounded into the silicone composition according to the invention before (Y).

Quartz flour (Y) is a long-known slightly reinforcing filler and is preferably used for various reasons in the silicone compositions according to the invention in quantities of at least 3 wt. % and at most 90 wt. %. Possible reasons for using quartz flours are: to obtain thermal conductivity, self-deaeration of silicone compounds, reduction of surface tack, haptic effects, increasing density or cost reduction.

The nature of the quartz flour used plays no part in the effect described above. Both hydrophilic and also surface-treated quartz can be used. Examples of surface treatment agents, without limiting the invention thereto, are aminosilanes, epoxysilanes, methacrylsilanes, silazanes, methylsilanes, trimethylsilanes or vinylsilanes.

Examples of quartz flours which can be added to the silicone compositions according to the invention are:

Quartz types from Quarzwerke GmbH, Frechen, Germany, such as for example the SILBOND® type range, e.g.: W 6 EST, W12 EST, W12 MST, 600 AST, 600 EST, 600 MST, 600 RST, 600 VST, 600 TST, 800 AST, 800 EST, 800 RST, 800 TST; and the SIKRON® type range such as for example: SH300, SF300, SH500, SF500, SF600 and SF800. The quartz flours from other manufacturers are also suitable for the production of compositions according to the invention, such as for example the products of Hoffmann Mineral GmbH, Neuburg; Germany or of Busch Quarz GmbH, Schnaittenbach, Germany.

The average particle diameter is not responsible for the effect described, and for this reason can vary over wide ranges, for example from D90=1 μm to D90=200 μm. Other parameters also have no influence and can likewise be varied over wide ranges, such as bulk density, specific surface area, oil number, chromatic value, trace elements contained, etc.

The quartz-containing silicone compositions according to the invention can be utilized for the production of silicone rubber moldings, in cosmetic compositions, or for coating, or as sealing compounds.

EXAMPLES

In the examples described below, unless otherwise stated all parts and percentages stated relate to the weight. Unless otherwise stated, the examples below are carried out at a pressure of the surrounding atmosphere, i.e. at about 1000 hPa, and at room temperature, i.e. at 25° C., or at a temperature which is established on combination of the reactants at room temperature without additional heating or cooling. Below, all viscosity statements relate to a temperature of 25° C. The following examples illustrate the invention, without thereby having a limiting effect. The determination of the cyclic compound contents was performed by means of a calibrated headspace gas chromatography method (HS-GC). D3 means hexa-methylcyclotrisiloxane, D4 means octamethylcyclotetrasiloxane, D5 means decamethylcyclopentasiloxane and D6 means dodeca-methylcyclohexasiloxane.

The pH measurements were performed in de-ionized water, as saturated solution, by means of a calibrated pH-meter.

Example 1

150 g of α,ω-divinyl-terminal polydimethylsiloxane with an average chain length of 220 units are placed in a laboratory kneader from Stephan Werke Hameln, which is equipped with a ca.

500 ml capacity, coolable and heatable kneader unit. 5 g of calcium dihydroxide $Ca(OH)_2$ from Schäfer, Type Precal 54 are stirred in at room temperature (pH=12.7 determined according to aforesaid method). Within 10 minutes, portionwise 340 g of quartz flour from Quarzwerke GmbH, Type SIKRON SF 600 (hydrophilic type) are added portionwise and kneaded in. The mixture is then kneaded for one hour at 100° C. internal temperature.

After the production of the mixture, the following contents, which lay under the respective detection limits, were determined:

D3: <80 ppm (detection limit 80 ppm)
D4: <60 ppm (detection limit 60 ppm)
D5: <100 ppm (detection limit 100 ppm)
D6: <250 ppm (detection limit 250 ppm)

The subsequent storage takes place in sealed PE pots at various temperatures. The storage is intended to simulate the ageing of the compositions, wherein 50° C. represents an accelerated, but not unrealistic ageing temperature. A storage temperature of the products of 100° C. is not to be expected in practice. The experiments show the temperature dependence of cyclic compound formation, which even occurs after a short storage period. In the laboratory experiment, it can be assumed for the experiments with 100° C., that due to evaporation of the cyclic compounds through leaks in the holding vessel the content in the mixture decreases again somewhat, which can be clearly seen in the comparative examples.

Table 1 shows the measurements results from the storage of the composition from example 1 at various temperatures

TABLE 1

| Storage temp. | Storage period | D3 [ppm] | D4 [ppm] | D5 [ppm] | D6 [ppm] |
|---|---|---|---|---|---|
| 25° C. | 1 week | <80 | <60 | <100 | <250 |
| 25° C. | 2 weeks | <80 | <60 | <100 | <250 |
| 25° C. | 4 weeks | <80 | <60 | <100 | <250 |
| 25° C. | 8 weeks | <80 | <60 | <100 | <250 |
| 50° C. | 1 week | <80 | <60 | <100 | <250 |
| 50° C. | 2 weeks | <80 | <60 | <100 | <250 |
| 50° C. | 4 weeks | <80 | 60 | <100 | <250 |
| 50° C. | 8 weeks | <80 | 90 | <100 | <250 |
| 100° C. | 1 week | 160 | 200 | <100 | <250 |
| 100° C. | 2 weeks | 190 | 290 | <100 | <250 |
| 100° C. | 4 weeks | 210 | 370 | <100 | <250 |
| 100° C. | 8 weeks | 230 | 400 | <100 | <250 |

Example 2 (Comparative Example 1

150 g of α,ω-divinyl-terminal polydimethylsiloxane with an average chain length of 220 units is placed in a laboratory kneader from Stephan Werke Hameln, which is equipped with a ca. 500 ml capacity, coolable and heatable kneader unit. Within 10 minutes, portionwise 340 g of quartz flour from Quarzwerke GmbH, Type SIKRON SF 600 (hydrophilic type, pH=12.7 determined according to aforesaid method) are added portionwise and kneaded in. The mixture is then kneaded for 1 hour at 25° C. internal temperature.

After the production of the mixture, the following contents were determined:
D3: <80 ppm (detection limit 80 ppm)
D4: 90 ppm (detection limit 60 ppm)
D5: <100 ppm (detection limit 100 ppm)
D6: <250 ppm (detection limit 250 ppm)

Table 2 shows the measurement results for the composition from example 2 at various temperatures

TABLE 2

| Storage temp. | Storage period | D3 [ppm] | D4 [ppm] | D5 [ppm] | D6 [ppm] |
|---|---|---|---|---|---|
| 25° C. | 1 week | <80 | 330 | <100 | <250 |
| 25° C. | 2 weeks | <80 | 470 | <100 | <250 |
| 25° C. | 4 weeks | <80 | 700 | 150 | <250 |
| 25° C. | 8 weeks | <80 | 1170 | 310 | <250 |
| 50° C. | 1 week | <80 | 1810 | 620 | <250 |
| 50° C. | 2 weeks | 80 | 4230 | 1560 | 530 |
| 50° C. | 4 weeks | 90 | 6560 | 2490 | 660 |

TABLE 2-continued

| Storage temp. | Storage period | D3 [ppm] | D4 [ppm] | D5 [ppm] | D6 [ppm] |
|---|---|---|---|---|---|
| 50° C. | 8 weeks | 90 | 8650 | 3720 | 1210 |
| 100° C. | 1 week | 250 | 1001 | 5910 | 2680 |
| 100° C. | 2 weeks | 210 | 9350 | 5570 | 3300 |
| 100° C. | 4 weeks | 200 | 8610 | 5200 | 3400 |
| 100° C. | 8 weeks | 140 | 6500 | 4450 | 3480 |

Example 3 (Comparative Example 2

150 g of α,ω-divinyl-terminal polydimethylsiloxane with an average chain length of 220 units are placed in a laboratory kneader from Stephan Werke Hameln, which is equipped with a ca. 500 ml capacity coolable and heatable kneader unit. Within 10 minutes, portionwise 340 g of quartz flour from Quarzwerke GmbH, Type SIKRON SF 600 (hydrophilic type) are added portionwise and kneaded in. The mixture is then kneaded for one hour at 100° C. internal temperature.

After the production of the mixture, the following contents were determined:
D3: 180 ppm (detection limit 80 ppm)
D4: 520 ppm (detection limit 60 ppm)
D5: 210 ppm (detection limit 100 ppm)
D6: <250 ppm (detection limit 250 ppm)

Table 3 shows the measurement results from storage of the composition from example 3 at various temperatures

TABLE 3

| Storage temp. | Storage period | D3 [ppm] | D4 [ppm] | D5 [ppm] | D6 [ppm] |
|---|---|---|---|---|---|
| 25° C. | 1 week | <80 | 690 | 290 | <250 |
| 25° C. | 2 weeks | <80 | 1220 | 440 | <250 |
| 25° C. | 4 weeks | <80 | 2300 | 770 | 250 |
| 25° C. | 8 weeks | <80 | 4090 | 1440 | 400 |
| 50° C. | 1 week | 80 | 1790 | 670 | 280 |
| 50° C. | 2 weeks | 80 | 3540 | 1320 | 500 |
| 50° C. | 4 weeks | 90 | 6120 | 2280 | 750 |
| 50° C. | 8 weeks | 90 | 7910 | 2960 | 890 |
| 100° C. | 1 week | 230 | 6190 | 4170 | 2320 |
| 100° C. | 2 weeks | 200 | 6060 | 4070 | 2280 |
| 100° C. | 4 weeks | 170 | 5560 | 3890 | 2000 |
| 100° C. | 8 weeks | 100 | 3060 | 2860 | 1760 |

Example 4

150 g of α,ω-divinyl-terminal polydimethylsiloxane with an average chain length of 220 units are placed in a laboratory kneader from Stephan Werke Hameln, which is equipped with a ca. 500 ml capacity coolable and heatable kneader unit. 5 g of calcium dihydroxide $Ca(OH)_2$ from Schäfer, Type Precal 54 are stirred in at room temperature; (pH=12.7 determined according to aforesaid method). Within 10 minutes, portionwise 340 g of quartz flour from Quarzwerke GmbH, Type SILBOND 600 TST (hydrophobic type) are added portionwise and kneaded in. The mixture is then kneaded for one hour at 100° C. internal temperature.

After the production of the mixture, the following contents were determined:
D3: <80 ppm (detection limit 80 ppm)
D4: <60 ppm (detection limit 60 ppm)
D5: <100 ppm (detection limit 100 ppm)
D6: <250 ppm (detection limit 250 ppm)

Table 4 shows the measurement results from storage of the composition from example 4 at various temperatures

TABLE 4

| Storage temp. | Storage period | D3 [ppm] | D4 [ppm] | D5 [ppm] | D6 [ppm] |
|---|---|---|---|---|---|
| 25° C. | 1 week | <80 | <60 | <100 | <250 |
| 25° C. | 2 weeks | <80 | <60 | <100 | <250 |
| 25° C. | 4 weeks | <80 | <60 | <100 | <250 |
| 25° C. | 8 weeks | <80 | <60 | <100 | <250 |
| 50° C. | 1 week | <80 | <60 | <100 | <250 |
| 50° C. | 2 weeks | <80 | <60 | <100 | <250 |
| 50° C. | 4 weeks | <80 | <60 | <100 | <250 |
| 50° C. | 8 weeks | <80 | <60 | <100 | <250 |
| 100° C. | 1 week | <80 | <60 | <100 | <250 |
| 100° C. | 2 weeks | <80 | 100 | <100 | <250 |
| 100° C. | 4 weeks | 120 | 150 | <100 | <250 |
| 100° C. | 8 weeks | 160 | 280 | <100 | <250 |

Example 5 (Comparative Example 3

150 g of α,ω-divinyl-terminal polydimethylsiloxane with an average chain length of 220 units are placed in a laboratory kneader from Stephan Werke Hameln, which is equipped with a ca. 500 ml capacity coolable and heatable kneader unit. Within 10 minutes, portionwise 340 g of quartz flour from Quarzwerke GmbH, Type SILBOND 600 TST (hydrophobic type) are added portionwise and kneaded in. The mixture is then kneaded for one hour at 100° C. internal temperature.

After the production of the mixture, the following contents were determined:
D3: 180 ppm (detection limit 80 ppm)
D4: 520 ppm (detection limit 60 ppm)
D5: 210 ppm (detection limit 100 ppm)
D6: <250 ppm (detection limit 250 ppm)

Table 5 shows the measurement results from storage of the composition from example 5 at various temperatures

TABLE 5

| Storage temp. | Storage period | D3 [ppm] | D4 [ppm] | D5 [ppm] | D6 [ppm] |
|---|---|---|---|---|---|
| 25° C. | 1 week | <80 | 690 | 290 | <250 |
| 25° C. | 2 weeks | <80 | 1220 | 440 | <250 |
| 25° C. | 4 weeks | <80 | 2300 | 770 | 250 |
| 25° C. | 8 weeks | <80 | 4090 | 1440 | 400 |
| 50° C. | 1 week | 80 | 1790 | 670 | 280 |
| 50° C. | 2 weeks | 80 | 3540 | 1320 | 500 |
| 50° C. | 4 weeks | 90 | 6120 | 2280 | 750 |
| 50° C. | 8 weeks | 90 | 7910 | 2960 | 890 |
| 100° C. | 1 week | 230 | 6190 | 4170 | 2320 |
| 100° C. | 2 weeks | 200 | 6060 | 4070 | 2280 |
| 100° C. | 4 weeks | 170 | 5560 | 3890 | 2000 |
| 100° C. | 8 weeks | 90 | 3060 | 2860 | 1760 |

Example 6

150 g of α,ω-silanol-terminal polydimethylsiloxane with an average chain length of 220 units are placed in a laboratory kneader from Stephan Werke Hameln, which is equipped with a ca. 500 ml capacity coolable and heatable kneader unit. 5 g of magnesium dihydroxide Mg(OH)$_2$ ANKERMAG B 21 are stirred in at room temperature; (pH=10.4 determined according to aforesaid method). Within 10 minutes, portionwise 340 g of quartz flour from Quarzwerke GmbH, Type SILBOND 600 TST (hydrophobic type) are added portionwise and kneaded in. The mixture is then kneaded for one hour at 100° C. internal temperature.

After the production of the mixture, the following contents were determined:
D3: <80 ppm (detection limit 80 ppm)
D4: <60 ppm (detection limit 60 ppm)
D5: <100 ppm (detection limit 100 ppm)
D6: <250 ppm (detection limit 250 ppm)

Table 6 shows the measurement results from storage of the composition from example 6 at various temperatures

TABLE 6

| Storage temp. | Storage period | D3 [ppm] | D4 [ppm] | D5 [ppm] | D6 [ppm] |
|---|---|---|---|---|---|
| 25° C. | 1 week | <80 | <60 | <100 | <250 |
| 25° C. | 2 weeks | <80 | <60 | <100 | <250 |
| 25° C. | 4 weeks | <80 | <60 | <100 | <250 |
| 25° C. | 8 weeks | <80 | <60 | <100 | <250 |
| 50° C. | 1 week | <80 | <60 | <100 | <250 |
| 50° C. | 2 weeks | <80 | <60 | <100 | <250 |
| 50° C. | 4 weeks | <80 | <60 | <100 | <250 |
| 50° C. | 8 weeks | <80 | 80 | <100 | <250 |
| 100° C. | 1 week | <80 | 80 | <100 | <250 |
| 100° C. | 2 weeks | 100 | 100 | <100 | <250 |
| 100° C. | 4 weeks | 140 | 170 | <100 | <250 |
| 100° C. | 8 weeks | 200 | 350 | <100 | <250 |

Example 7

150 g of α,ω-divinyl-terminal polydimethylsiloxane with an average chain length of 220 units are placed in a laboratory kneader from Stephan Werke Hameln, which is equipped with a ca. 500 ml capacity coolable and heatable kneader unit. 5 g of magnesium dihydroxide Mg(OH)$_2$ ANKERMAG B 21 are stirred in at room temperature; (pH=10.4 determined according to aforesaid method). Within 10 minutes, portionwise 340 g of quartz flour from Quarzwerke GmbH, Type SILBOND 600 TST (hydrophobic type) are added portionwise and kneaded in. The mixture is then kneaded for one hour at 100° C. internal temperature.

After the production of the mixture, the following contents were determined:
D3: <80 ppm (detection limit 80 ppm)
D4: <60 ppm (detection limit 60 ppm)
D5: <100 ppm (detection limit 100 ppm)
D6: <250 ppm (detection limit 250 ppm)

Table 7 shows the measurement results from storage of the composition from example 7 at various temperatures

TABLE 7

| Storage temp. | Storage period | D3 [ppm] | D4 [ppm] | D5 [ppm] | D6 [ppm] |
|---|---|---|---|---|---|
| 25° C. | 1 week | <80 | <60 | <100 | <250 |
| 25° C. | 2 weeks | <80 | <60 | <100 | <250 |
| 25° C. | 4 weeks | <80 | <60 | <100 | <250 |
| 25° C. | 8 weeks | <80 | <60 | <100 | <250 |
| 50° C. | 1 week | <80 | <60 | <100 | <250 |
| 50° C. | 2 weeks | <80 | <60 | <100 | <250 |
| 50° C. | 4 weeks | <80 | <60 | <100 | <250 |
| 50° C. | 8 weeks | <80 | 80 | <100 | <250 |
| 100° C. | 1 week | <80 | 80 | <100 | <250 |
| 100° C. | 2 weeks | 100 | 100 | <100 | <250 |
| 100° C. | 4 weeks | 140 | 170 | <100 | <250 |
| 100° C. | 8 weeks | 200 | 350 | <100 | <250 |

Example 8

150 g of α,ω-divinyl-terminal polydimethylsiloxane with an average chain length of 600 units are placed in a laboratory kneader from Stephan Werke Hameln, which is equipped with a ca. 500 ml capacity coolable and heatable kneader unit. 5 g of magnesium dihydroxide $Mg(OH)_2$ ANKERMAG B 21 are stirred in at room temperature; (pH=10.4 determined according to aforesaid method). Within 10 minutes, portionwise 340 g of quartz flour from Quarzwerke GmbH, Type SIKRON SF 600 are added portionwise and kneaded in. The mixture is then kneaded for one hour at 100° C. internal temperature.

After the production of the mixture, the following contents were determined:
D3: <80 ppm (detection limit 80 ppm)
D4: <60 ppm (detection limit 60 ppm)
D5: <100 ppm (detection limit 100 ppm)
D6: <250 ppm (detection limit 250 ppm)

Table 8 shows the measurement results from storage of the composition from example 8 at various temperatures.

TABLE 8

| Storage temp. | Storage period | D3 [ppm] | D4 [ppm] | D5 [ppm] | D6 [ppm] |
|---|---|---|---|---|---|
| 25° C. | 1 week | <80 | <60 | <100 | <250 |
| 25° C. | 2 weeks | <80 | <60 | <100 | <250 |
| 25° C. | 4 weeks | <80 | <60 | <100 | <250 |
| 25° C. | 8 weeks | <80 | <60 | <100 | <250 |
| 50° C. | 1 week | <80 | <60 | <100 | <250 |
| 50° C. | 2 weeks | <80 | <60 | <100 | <250 |
| 50° C. | 4 weeks | <80 | <60 | <100 | <250 |
| 50° C. | 8 weeks | <80 | <60 | <100 | <250 |
| 100° C. | 1 week | <80 | 100 | <100 | <250 |
| 100° C. | 2 weeks | 80 | 130 | <100 | <250 |
| 100° C. | 4 weeks | 150 | 200 | <100 | <250 |
| 100° C. | 8 weeks | 220 | 380 | <100 | <250 |

The invention claimed is:

1. A method for the production of a storage stable, quartz filler-containing, moisture-curable condensation-crosslinkable or peroxide-induced crosslinkable silicone composition containing at least one silicone component in which cyclic siloxane generation is to be reduced, comprising reducing cyclic siloxane generation by compounding 0.1-5 wt. % of a basic-reacting additive into at least a part of the silicone component, and then incorporating a quartz flour filler therein, wherein the wt. % of basic-reacting additive is based on the weight of the non-quartz ingredients of the at least one silicon component, the basic-reacting additive is selected from the group consisting of solid, particulate inorganic compounds which, measured as a saturated solution in deionized water, exhibit a pH of from 9-14, and wherein the composition, when cured, forms a solid non-foam elastomer.

2. The method of claim 1, wherein the basic-reacting additive comprises an inorganic compound which has a pH from 9 to 13, measured as a saturated solution in de-ionized water.

3. The method of claim 1, wherein the basic-reacting additive is selected from the group consisting of alkali metal hydroxides, alkali metal carbonates, alkaline earth metal hydroxides, alkaline earth metal carbonates, alkali phosphates, alkali hydrogen phosphates, alkaline earth metal phosphates, alkaline earth metal hydrogen phosphates, and mixtures thereof.

4. The method of claim 1, wherein the basic-reacting additive is selected from the group consisting of $Mg(OH)_2$, $Ca(OH)_2$, and mixtures thereof.

5. The method of claim 1, wherein the quartz filler-containing silicone composition is a moisture-curing, condensation-crosslinkable silicone composition.

6. The method of claim 1, wherein the quartz filler-containing composition is a moisture-curable condensation crosslinking composition consisting of at least one organopolysiloxane with terminal silanol groups; a silane or siloxane crosslinker; a crosslinking catalyst which is an organotin or organotitanium compound or metal compound of main groups I and II of the periodic table, and mixtures thereof; and optionally, additive(s) selected from the group consisting of fillers other than quartz, fungicides, fragrances, plasticizers, rheological additives, corrosion inhibitors, oxidation inhibitors, heat and/or light stabilizers, agents for influencing electrical properties, dispersing additives, solvents, adhesion promoters, pigments, dyes, organic polymers, and mixtures thereof.

7. The method of claim 1, wherein the quartz filler-containing composition is a peroxide-induced crosslinkable composition consisting of at least one organopolysiloxane having at least two aliphatically unsaturated groups, an organic peroxide, and optionally an additive selected from the group consisting of fillers other than quartz, fungicides, fragrances, plasticizers, rheological additives, corrosion inhibitors, oxidation inhibitors, heat and/or light stabilizers, agents for influencing electrical properties, dispersing additives, solvents, adhesion promoters, pigments, dyes, organic polymers, and mixtures thereof.

* * * * *